(12) United States Patent
Paulla et al.

(10) Patent No.: US 11,627,852 B2
(45) Date of Patent: *Apr. 18, 2023

(54) VACUUM CLEANER

(71) Applicant: Techtronic Floor Care Technology Limited, Tortola (VG)

(72) Inventors: Kirti Kant Paulla, Charlotte, NC (US); David Khalil, College Park, MD (US); Blake Guzewicz, Charlotte, NC (US); Jake Tyler, Charlotte, NC (US)

(73) Assignee: Techtronic Floor Care Technology Limited, Tortola (VG)

( * ) Notice: Subject to any disclaimer, the term of this patent is extended or adjusted under 35 U.S.C. 154(b) by 106 days.

This patent is subject to a terminal disclaimer.

(21) Appl. No.: 17/211,041

(22) Filed: Mar. 24, 2021

(65) Prior Publication Data

US 2021/0204779 A1   Jul. 8, 2021

Related U.S. Application Data

(63) Continuation of application No. 16/531,823, filed on Aug. 5, 2019, now Pat. No. 10,959,587.

(Continued)

(51) Int. Cl.
*A47L 9/04* (2006.01)
*A47L 9/16* (2006.01)
(Continued)

(52) U.S. Cl.
CPC ............. *A47L 9/1666* (2013.01); *A47L 9/102* (2013.01); *A47L 9/16* (2013.01); *A47L 9/1625* (2013.01);
(Continued)

(58) Field of Classification Search
CPC ............. A47L 9/04; A47L 9/1625; A47L 9/16
See application file for complete search history.

(56) References Cited

U.S. PATENT DOCUMENTS

| 5,788,848 A | 8/1998 | Blanche et al. |
| 6,375,696 B2 | 4/2002 | Wegelin et al. |

(Continued)

FOREIGN PATENT DOCUMENTS

| AU | 2011265313 A1 | 7/2012 |
| CN | 1969734 A | 5/2007 |

(Continued)

OTHER PUBLICATIONS

Chinese Patent Office Action for Application No. 201980044207.X dated Aug. 23, 2021 (14 pages including statement of relevance).

(Continued)

*Primary Examiner* — Michael D Jennings
(74) *Attorney, Agent, or Firm* — Michael Best & Friedrich LLP

(57) ABSTRACT

A vacuum cleaner includes a suction inlet, a suction source configured to generate an airflow through the suction inlet to draw debris with the airflow through the suction inlet, and a separator assembly. The separator assembly includes a housing having an air inlet and an air outlet, a debris collection chamber within the housing, and an inner chamber formed within a shroud that defines a cyclone axis and has a perforated portion. The inner chamber has a first end and a second end. The first end has a tangential inlet. The second end is open toward the debris collection chamber. An outflow passageway is outside of the shroud and in fluid communication with the air outlet and a filter is in fluid communication with the outflow passageway.

20 Claims, 12 Drawing Sheets

Related U.S. Application Data

(60) Provisional application No. 62/714,857, filed on Aug. 6, 2018.

(51) Int. Cl.
  *A47L 9/10* (2006.01)
  *B01D 46/24* (2006.01)
  *B01D 45/12* (2006.01)
  *B01D 46/52* (2006.01)
  *B01D 50/20* (2022.01)

(52) U.S. Cl.
  CPC ............. *B01D 45/12* (2013.01); *B01D 46/24* (2013.01); *B01D 46/521* (2013.01); *B01D 50/20* (2022.01); *A47L 9/04* (2013.01); *B01D 2279/55* (2013.01)

(56) References Cited

U.S. PATENT DOCUMENTS

| | | | |
|---|---|---|---|
| 6,511,595 B2 | 1/2003 | Crompton et al. | |
| 6,596,044 B1 | 7/2003 | Bilek et al. | |
| 6,641,720 B1 | 11/2003 | Crompton et al. | |
| 6,772,475 B2 | 8/2004 | Weber et al. | |
| 6,818,032 B2 | 11/2004 | Bilek et al. | |
| 6,920,665 B2 | 7/2005 | Tucker | |
| 7,100,234 B2 | 9/2006 | Weber et al. | |
| 7,143,469 B2 | 12/2006 | Moine et al. | |
| 7,159,277 B2 | 1/2007 | Steiner et al. | |
| 7,188,389 B2 | 3/2007 | Moine et al. | |
| 7,243,393 B2 | 7/2007 | Matusz et al. | |
| 7,267,704 B2 | 9/2007 | Allgeier | |
| 8,443,486 B2 | 5/2013 | Yamaura et al. | |
| 9,242,194 B2 | 1/2016 | Van Der Kool et al. | |
| 9,279,555 B2 | 3/2016 | Bassett | |
| 9,656,816 B2 | 5/2017 | Wilkinson et al. | |
| 10,064,530 B2 | 9/2018 | Krebs et al. | |
| 10,820,767 B2 | 11/2020 | Krebs et al. | |
| 2001/0018865 A1 | 9/2001 | Wegelin et al. | |
| 2002/0030005 A1 | 3/2002 | Crompton et al. | |
| 2002/0104185 A1 | 8/2002 | Weber et al. | |
| 2002/0124346 A1 | 9/2002 | Steiner et al. | |
| 2002/0129462 A1 | 9/2002 | Matusz et al. | |
| 2002/0166310 A1 | 11/2002 | Bilek et al. | |
| 2002/0184731 A1 | 12/2002 | Moine et al. | |
| 2003/0024068 A1 | 2/2003 | Tucker | |
| 2003/0037405 A1 | 2/2003 | Moine et al. | |
| 2004/0206238 A1 | 10/2004 | Allgeier | |
| 2004/0221421 A1 | 11/2004 | Weber et al. | |
| 2006/0130448 A1 | 6/2006 | Han et al. | |
| 2006/0130449 A1 | 6/2006 | Han et al. | |
| 2007/0226948 A1 | 10/2007 | Due | |
| 2009/0313783 A1 | 12/2009 | Nakano et al. | |
| 2010/0275406 A1 | 11/2010 | Yamaura et al. | |
| 2012/0047681 A1* | 3/2012 | Charlton | A47L 9/1683 15/347 |
| 2012/0047682 A1* | 3/2012 | Makarov | A47L 9/1666 15/347 |
| 2012/0192378 A1 | 8/2012 | Bassett | |
| 2013/0081224 A1 | 4/2013 | Van Der Kool et al. | |
| 2014/0059800 A1 | 3/2014 | Bassett | |
| 2015/0230677 A1* | 8/2015 | Andrikanish | A47L 9/102 15/353 |
| 2016/0113461 A1 | 4/2016 | Rukavina et al. | |
| 2017/0071426 A1* | 3/2017 | Krebs | A47L 9/22 |
| 2017/0267466 A1 | 9/2017 | Wilkinson et al. | |
| 2018/0055320 A1* | 3/2018 | Hwang | A47L 9/1633 |
| 2018/0338658 A1 | 11/2018 | Krebs et al. | |
| 2019/0335965 A1* | 11/2019 | Yang | A47L 9/1641 |
| 2021/0038043 A1 | 2/2021 | Krebs et al. | |

FOREIGN PATENT DOCUMENTS

| | | |
|---|---|---|
| CN | 101108110 A | 1/2008 |
| CN | 201398933 Y | 2/2010 |
| CN | 101669790 A | 3/2010 |
| CN | 102233326 A | 11/2011 |
| CN | 102334955 A | 2/2012 |
| WO | 02076276 A1 | 10/2002 |
| WO | 2018036124 A1 | 3/2018 |

OTHER PUBLICATIONS

International Search Report and Written Opinion for Application No. PCT/US2019/045100 dated Jun. 15, 2020 (14 pages).

Examination Report No. 1 issued by the Australian Government for Application No. 2019388543 dated Jul. 2, 2021 (2 pages).

\* cited by examiner

VACUUM CLEANER

CROSS-REFERENCE TO RELATED APPLICATIONS

This application is a continuation of U.S. patent application Ser. No. 16/531,823, filed on Aug. 5, 2019, which issued as U.S. Pat. No. 10,959,587 on Mar. 30, 2021, which claims priority to U.S. Provisional Patent Application No. 62/714,857, filed on Aug. 6, 2018, the entire content all of which are incorporated herein by reference.

FIELD OF THE INVENTION

The present invention relates to vacuum cleaners, and more particularly to vacuum cleaners with separator assemblies.

BACKGROUND OF THE INVENTION

Vacuum cleaners use separator assemblies to separate large dust and debris from the airflow that is suctioned into the vacuum cleaner.

SUMMARY OF THE INVENTION

In one embodiment, a vacuum cleaner includes a suction inlet, a suction source configured to generate an airflow through the suction inlet to draw debris with the airflow through the suction inlet, and a separator assembly downstream from the suction inlet for separating debris from the airflow. The separator assembly includes a housing having an air inlet and an air outlet, a debris collection chamber within the housing, and an inner chamber formed within a shroud that defines a cyclone axis and has a perforated portion. The inner chamber has a first end and a second end. The first end has a tangential inlet. The second end is open toward the debris collection chamber. The separator assembly also includes an outflow passageway outside of the shroud and in fluid communication with the air outlet and a filter in fluid communication with the outflow passageway. The first end of the inner chamber is positioned between the air outlet and the second end of the inner chamber. The tangential inlet is configured to provide airflow and debris to rotate around the cyclone axis within the inner chamber. The airflow and debris is configured to move from the first end of the inner chamber toward the second end of the inner chamber unimpeded by any structure extending transverse to the cyclone axis. The airflow is configured to exit the inner chamber and enter the outflow passageway by passing through the perforated portion of the shroud.

In one embodiment, a vacuum cleaner includes a suction inlet, a suction source configured to generate an airflow through the suction inlet to draw debris with the airflow through the suction inlet, and a separator assembly downstream from the suction inlet for separating debris from the airflow. The separator assembly includes a housing having an air inlet and an air outlet, a debris collection chamber within the housing, and an inner chamber formed within a shroud that defines a cyclone axis and has a perforated portion. The inner chamber has a first end and a second end. The second end is open toward the debris collection chamber. The air inlet is configured to provide the airflow and debris to rotate around the cyclone axis within the shroud. The separator assembly also includes an outflow passageway outside of the shroud and in fluid communication with the air outlet. Air flow is configured to exit the inner chamber and enter the outflow passageway by passing through the perforated portion of the shroud. The separator assembly also includes a filter chamber between the first end of the inner chamber and the air outlet. The filter chamber defines a longitudinal axis. The separator assembly also includes a cylindrical filter in the filter chamber. The cylindrical filter is arranged along the longitudinal axis. The airflow is configured to flow through the cylindrical filter in a direction transverse to the longitudinal axis.

In one embodiment, a vacuum cleaner includes a suction inlet, a suction source configured to generate an airflow through the suction inlet to draw debris with the airflow through the suction inlet, and a separator assembly downstream from the suction inlet for separating debris from the airflow. The separator assembly includes a housing having an air inlet and an air outlet, a debris collection chamber within the housing, and an inner chamber within a shroud that defines a cyclone axis and has a perforated portion. The inner chamber has a first end and a second end. The second end is open toward the debris collection chamber. The air inlet is configured to provide the airflow and debris to rotate around the cyclone axis within the shroud. The separator assembly also includes an outflow passageway outside of the shroud and in fluid communication with the air outlet. The air flow is configured to exit the inner chamber and enter the outflow passageway by passing through the perforated portion of the shroud. The vacuum cleaner also includes a plurality of second stage cyclones. Each second stage cyclone has a second stage air inlet, a second stage air outlet, and a debris outlet. Each second stage air inlet is in fluid communication with the outflow passageway. The vacuum cleaner also includes a filter in communication with each of the second stage air outlets.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
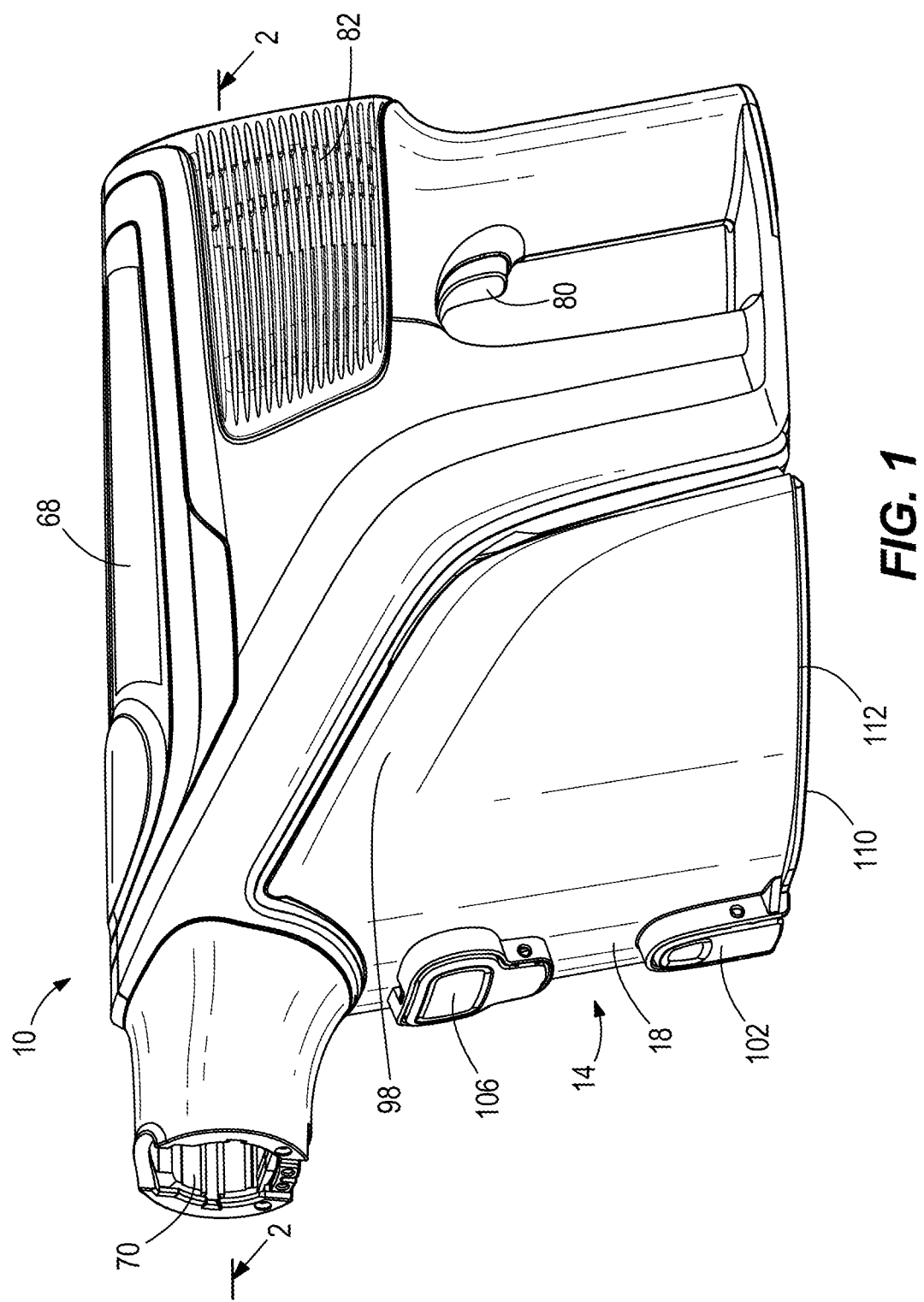
FIG. 1 is a perspective view of a vacuum cleaner.
Figure 2:
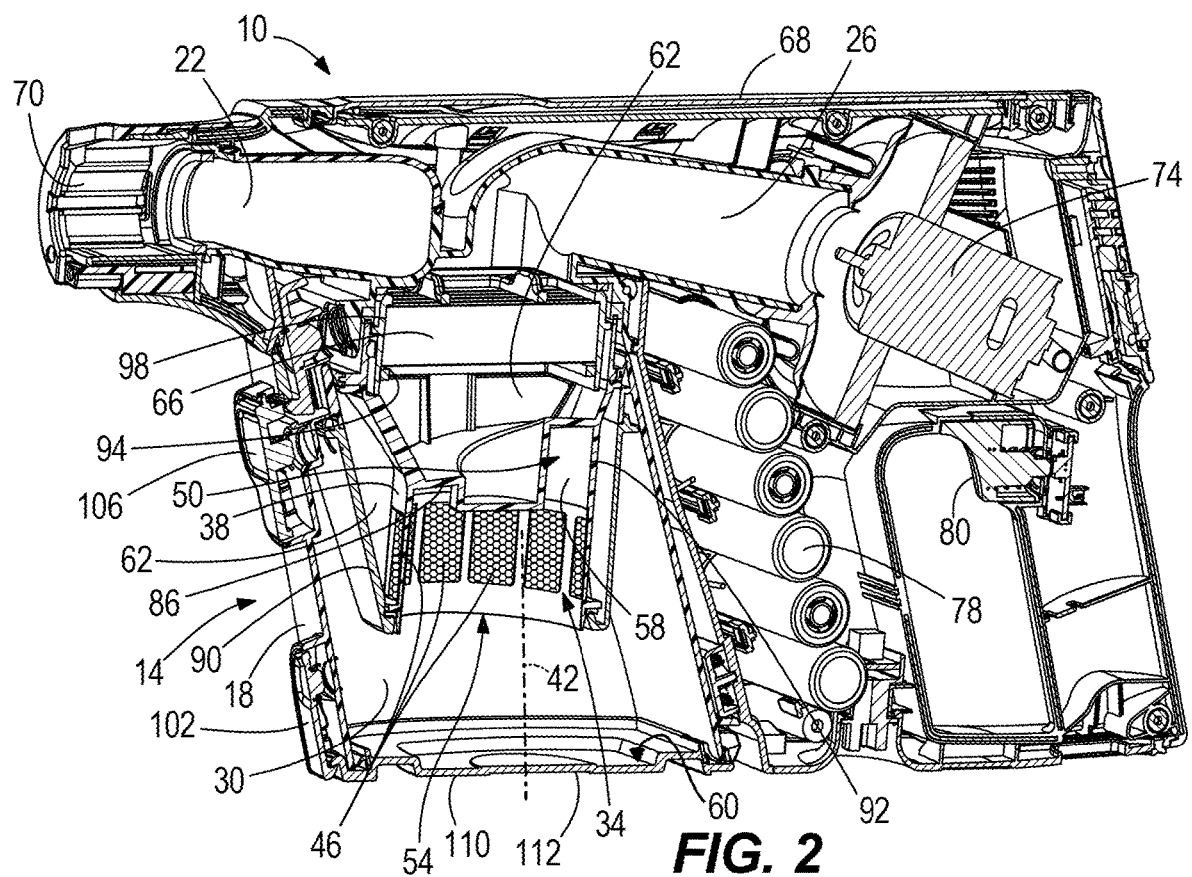
FIG. 2 is a cross-sectional view of the vacuum cleaner of FIG. 1.
Figure 3:
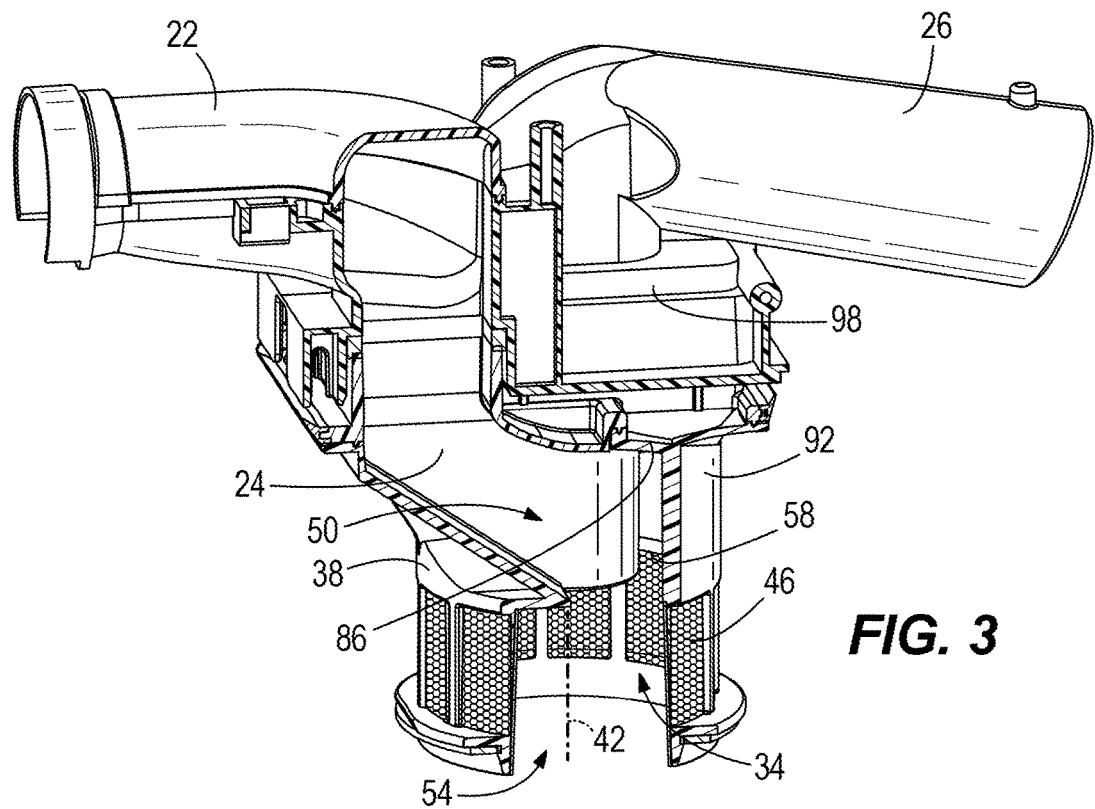
FIG. 3 is a partial cross-sectional view of a portion of separator assembly of the vacuum cleaner of FIG. 1.

FIGS. 1 and 2 illustrate a vacuum cleaner 10. As shown in FIGS. 2 and 3 and explained in further detail below, the vacuum cleaner 10 includes a separator assembly 14 including a separator assembly housing 18 having an air inlet 22, an air outlet 26, and a debris collection chamber 30 within the housing 18. The separator assembly 14 also includes an inner chamber 34 formed within a shroud 38 that defines a cyclone axis 42 and has a perforated portion 46. The inner chamber 34 has a first end 50 and a second end 54. The first end 50 has a tangential inlet 58 to the inner chamber and the second end 54 of the inner chamber is open toward the debris collection chamber 30. The debris collection chamber 30 surrounds the shroud 38 and has an end 60 that is intersected by the cyclone axis 42 and spaced from the second end 54 of the inner chamber 34. The separator assembly 14 also includes an outflow passageway 62 outside of the shroud 38 and in fluid communication with the air outlet 26. The separator assembly 14 also includes a filter 66 in fluid communication with the outflow passageway 62. The first end 50 of the inner chamber 34 is positioned between the air outlet 26 and the second end 54 of the inner chamber 34.

During operation of the vacuum cleaner 10, the tangential inlet 58 is configured to provide an airflow and debris to rotate around the cyclone axis 42 within the inner chamber 34. Once in the inner chamber 34, the airflow and debris move from the first end 50 of the inner chamber 34 to the second end 54 of the inner chamber 34 unimpeded by any structure extending transverse to the cyclone axis 42. Specifically, within the inner chamber 34 there is no structure extending radially inward from the shroud 38 toward the cyclone axis 42 and there is no structure extending radially outward from the cyclone axis 42 toward the shroud 38. While a portion of the shroud 38 that secures the perforated portion 46 or the perforated portion 46 itself may bulge inward towards the cyclone axis 42 a nominal amount, this does not constitute structure extending transverse to the cyclone axis 42. The airflow exits the inner chamber 34 by passing through the perforated portion 46 of the shroud 38 to the outflow passageway 62.

With reference again to FIGS. 1 and 2, the vacuum cleaner 10 includes an outer housing 68, a suction inlet 70 and a suction source, such as suction motor 74, to generate an airflow through the suction inlet 70 to draw debris with the airflow through the suction inlet 70. As shown in FIG. 2, the suction inlet 70 is fluidly coupled to the air inlet 22 of the separator assembly 14, and the suction motor 74 is fluidly coupled to the air outlet 26 of the separator assembly 14. In one alternative, the suction inlet 70 is fluidly coupled to the suction source and the outlet of the suction source is coupled to the air inlet 22 of the separator assembly 14. The vacuum cleaner 10 includes a power source, such as one or more rechargeable batteries 78, to provide power to the suction motor 74, and a switch 80 to actuate the suction motor 74. In other embodiments, the vacuum cleaner 10 includes a rechargeable battery pack that is removable from the housing 68. The vacuum cleaner 10 also includes a plurality of exhaust vents 82 on the housing 68 to exhaust the airflow from the suction motor 74 and out of the housing 68.

With continued reference to FIGS. 2 and 3, the first end 50 of the inner chamber 34 includes a helical ramp 86 in fluid communication with the air inlet 22 by a duct 24, the helical ramp 86 extending toward the second end 54 of the inner chamber 34 and leading to the tangential inlet 58. The duct 24 passes through the outflow passageway 62 to connect the air inlet 22 to the tangential inlet 58 of the inner chamber 34. As also shown in FIG. 2, the separator assembly 14 includes a partition 90 separating the outflow passageway 62 from the debris collection chamber 30. In the embodiment illustrated in FIG. 2, the partition 90 is shaped as a frustrum extending away from the second end 54 of the inner chamber 34. In the illustrated embodiment, the partition 90 extends away from the second end 54 of the inner chamber 34 such that the outflow passageway 62 is bounded by the partition 90 and the shroud 38. In another embodiment, the partition 90 extends in a direction toward the separator assembly housing 18, such that the outflow passageway 62 is bounded by the separator assembly housing 18 and the shroud 38. Also, in the embodiment illustrated in FIG. 2, the perforated portion 46 of the shroud 38 is adjacent the second end 54 of the inner chamber 34. In some embodiments, the perforated portion 46 of the shroud 38 is perforated by a plurality of apertures in a range from 0.15 to 0.40 mm in diameter. In other embodiments, the perforated portion 46 of the shroud 38 is perforated by a plurality of apertures in a range from 0.10 to 0.3 mm in diameter, and may be in the range of 0.10 to 0.25 mm in diameter. In some embodiments, the perforated portion 46 of the shroud 38 includes an etched perforated metal. Alternatively, the perforated portion 46 may be a stamped sheet, a screen mesh, or other perforated material. In the embodiment illustrated in FIG. 2, the shroud 38 includes a non-perforated portion 92 adjacent the first end 50 of the inner chamber 34.

As illustrated in the embodiment shown in FIG. 2, the filter 66 is positioned in a filter chamber 94 arranged at an upper end 98 of the housing 18 of the separator assembly 14. As further illustrated in the embodiment shown in FIG. 2, the filter chamber 94 is arranged between the first end 50 of the inner chamber 34 and the air outlet 26 of the separator assembly 14. The filter chamber 94 is in fluid communication with the outflow passageway 62. In one alternative, the filter 66 is not positioned in the separator assembly 14 but is mounted in the vacuum cleaner housing 68. In yet another alternative, not shown, a cylindrical filter is positioned around the shroud 38 in the outflow passageway 62, such that the air flow through the cylindrical filter is transverse to the cyclone axis 42 to enter the outflow passageway 62.

With reference to FIGS. 1 and 2, the separator assembly 14 includes a first latch 102 and a second latch 106. Actuating the first latch 102 causes a bottom door 110 at a lower end 112 of the separator assembly 14 to pivot open, allowing an operator to empty the debris collected in the debris collection chamber 30 without removing the separator assembly 14 from the housing 68 of the vacuum cleaner 10. The end 60 of the debris collection is also the lower end 112 of the separator assembly 14 and the bottom door 110. Actuating the second latch 106 allows an operator to remove the separator assembly 14 from the housing 68 of the vacuum cleaner 10. In the embodiment illustrated in FIGS.

1-3, the partition 90, the shroud 38, or both are removable from the upper end 98 of the housing 18 of the separator assembly 14. In one alternative, the partition 90 is integral with the separator assembly housing 18. In another alternative, the partition 90 is integral with the shroud 38. In yet another embodiment, the partition 90, the shroud 38, or both are removable from the lower end 112 of the housing 18 of the separator assembly 14.

In operation, an operator actuates the switch 80 to actuate the suction motor 74, which generates an airflow through the suction inlet 70 to draw debris with the airflow through the suction inlet 70. The airflow then moves from the suction inlet 70 to the air inlet 22 of the separator assembly 14. From the air inlet 22, the airflow moves along the duct 24 to the helical ramp 86 along the upper surface of the air passageway and enters the inner chamber 34 via the tangential inlet 58, which causes the airflow and debris to rotate around the cyclone axis 42 within the inner chamber 34. After entering the inner chamber 34, the airflow and debris move from the first end 50 of the inner chamber 34 to the second end 54 of the inner chamber 34 unimpeded by any structure extending transverse to the cyclone axis 42. The cyclonic action within inner chamber 34 causes larger debris to drop out of the airflow and into the debris collection chamber 30, because the second end 54 of the inner chamber 34 is open to the debris collection chamber 30. Meanwhile, the airflow exits the inner chamber 34 and enters the outflow passageway 62 by passing through the perforated portion 46 of the shroud 38. The airflow then moves through the outflow passageway 62 and into the filter chamber 94, where additional debris that passed through the perforated portion is filtered out of the airflow by the filter 66. The airflow then passes into the air outlet 26 and through suction motor 74 before it is exhausted out exhaust vents 84.

Figure 4:
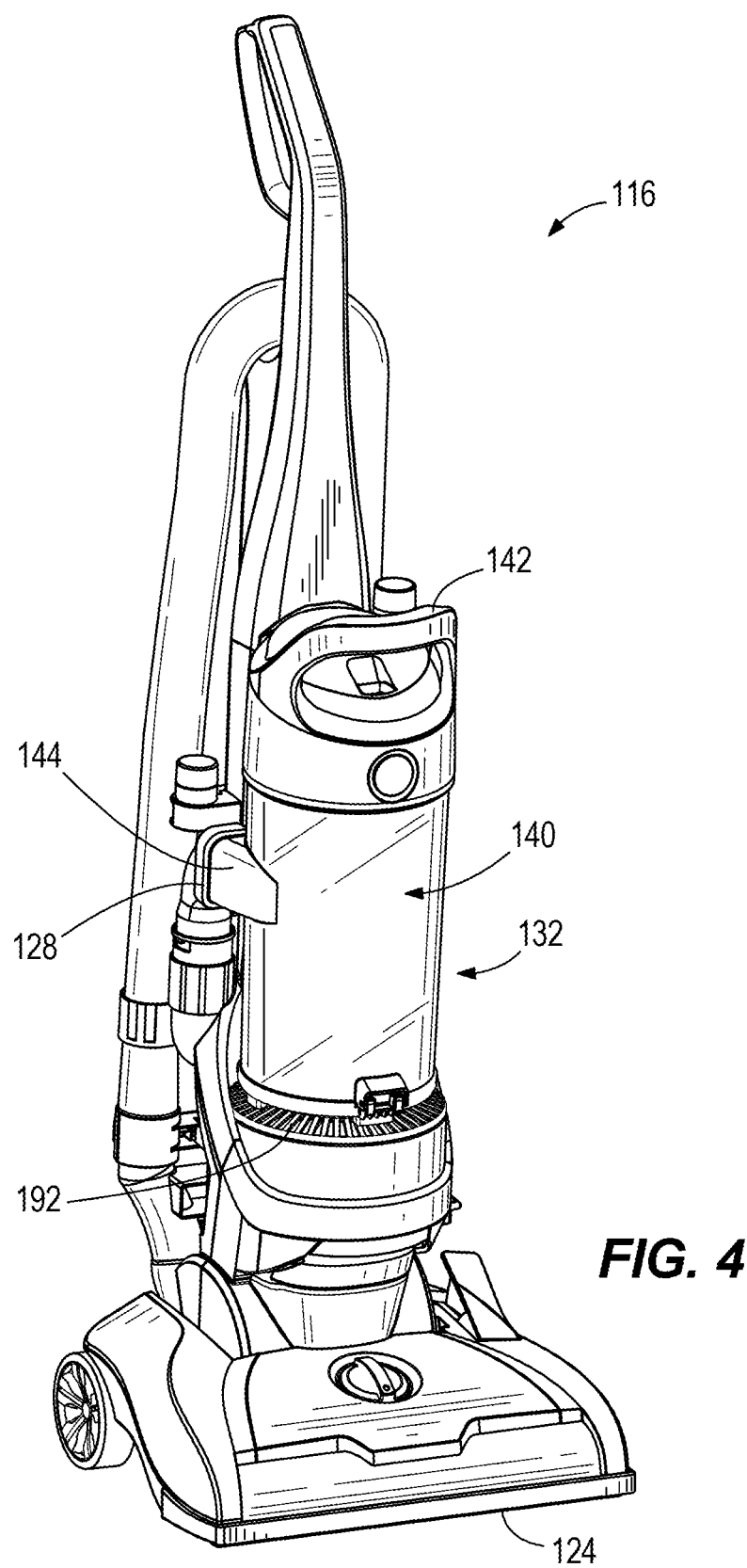
FIG. 4 is a perspective view of another embodiment of a vacuum cleaner.
Figure 5:
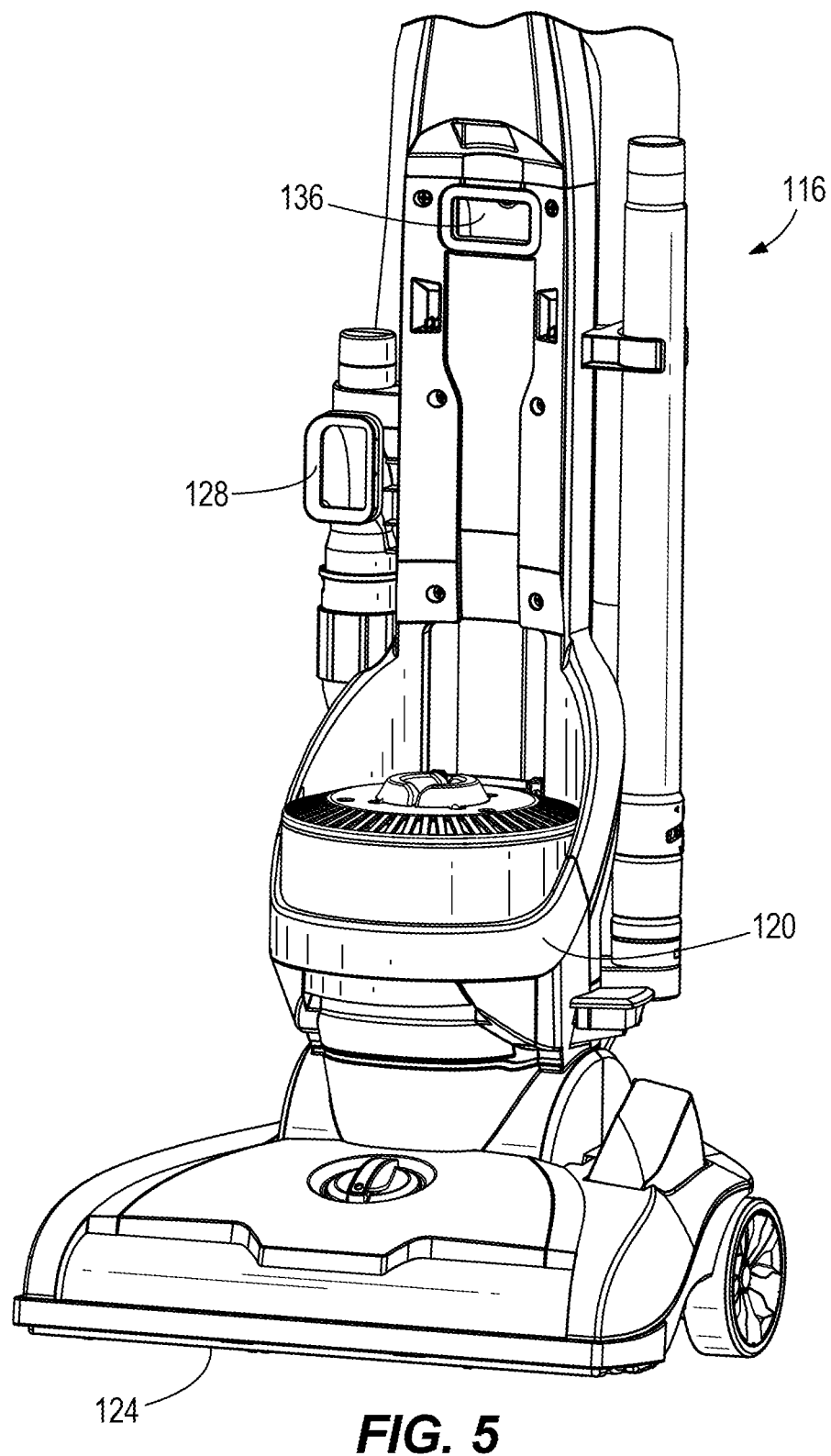
FIG. 5 is a perspective view of the vacuum cleaner of FIG. 1 with a separator assembly removed.

Another embodiment of a vacuum cleaner 116 is shown in FIGS. 4 and 5. The vacuum cleaner 116 includes a housing 120 and a suction inlet 124 leading to a first conduit 128 that transitions the airflow into a separator assembly 132. The vacuum cleaner 116 includes a suction motor (not shown) and a second conduit 136 (FIG. 5) leading to the suction motor from the separator assembly 132.

Figure 6:
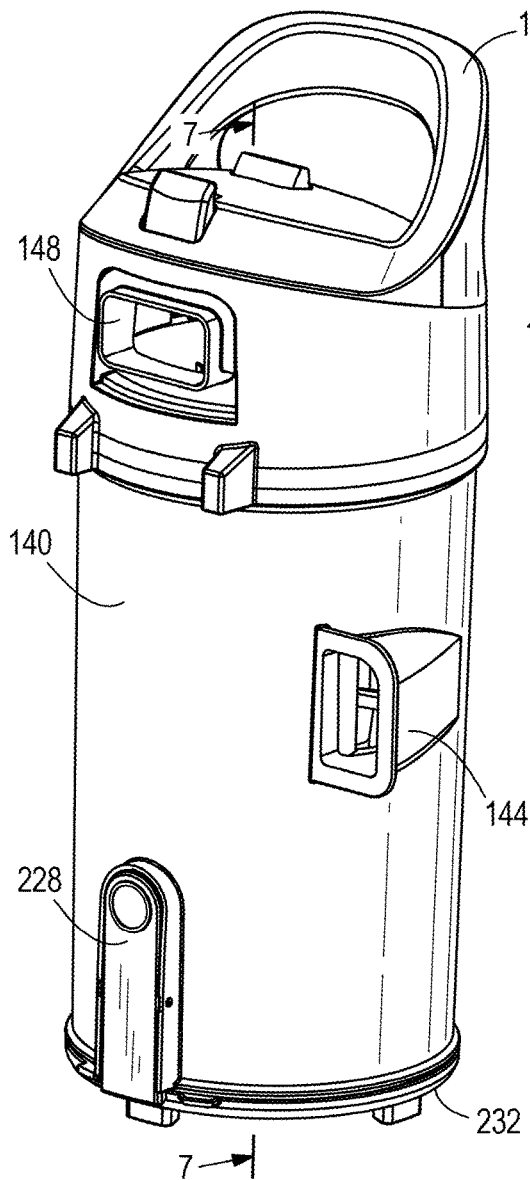
FIG. 6 is a perspective view of a separator assembly of the vacuum cleaner of FIG. 5.
Figure 7:
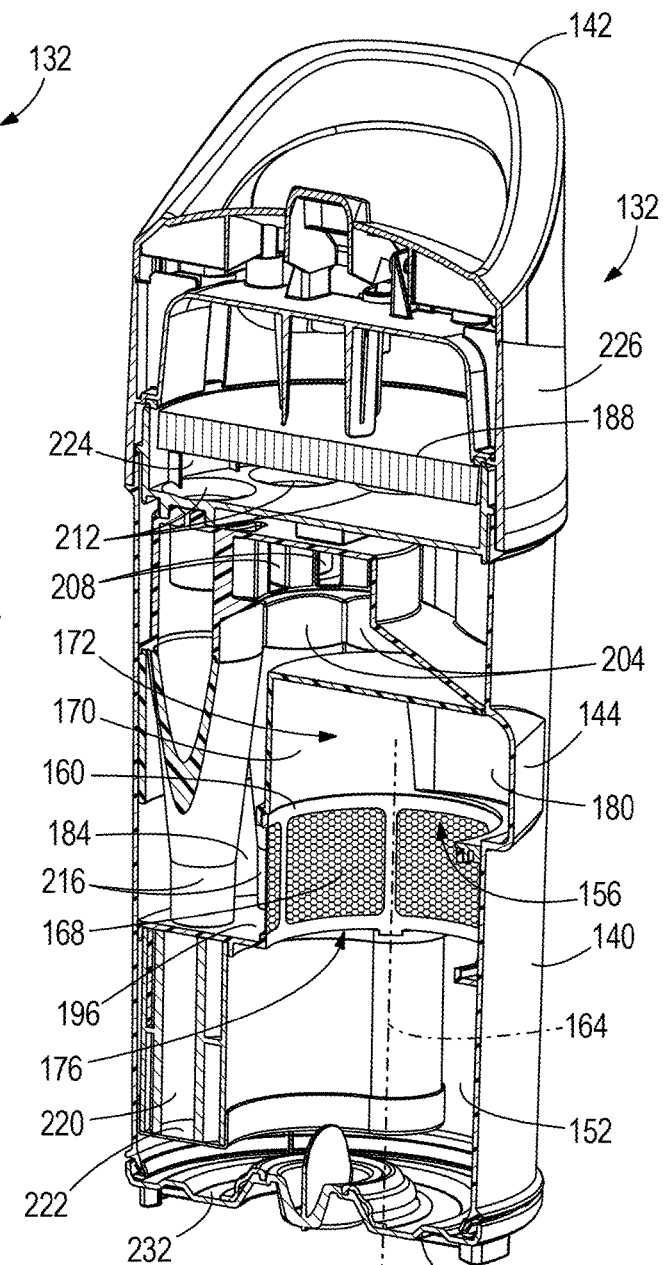
FIG. 7 is a cross-sectional view of the separator assembly of FIG. 6.

As shown in FIGS. 6 and 7, the separator assembly 132 includes a housing 140 having a handle 142, an air inlet 144, an air outlet 148, and a debris collection chamber 152 within the housing 140. When the separator assembly 132 is mounted on vacuum cleaner 116, the air inlet 144 is fluidly coupled with the first conduit 128 and the air outlet 148 is fluidly coupled with the second conduit 136. The separator assembly 132 also includes an inner chamber 156 formed within a shroud 160 that defines a cyclone axis 164. The shroud has a perforated portion 168 and a non-perforated portion 170. The inner chamber 156 has a first end 172 and a second end 176. The non-perforated portion 170 of the shroud is adjacent the first end 172 of the inner chamber 156.

In the embodiment illustrated by FIG. 7, the air inlet 144 is aligned with and is directly connected to a tangential inlet 180 leading to the inner chamber 156 at the first end 172, and the second end 176 of the inner chamber 156 is open toward the debris collection chamber 152. In one embodiment, not shown, the first end 172 of the inner chamber 156 includes a helical ramp in fluid communication with the air inlet 144 and the tangential inlet 180. The separator assembly 132 also includes an outflow passageway 184 outside of the shroud 160 and in fluid communication with the air outlet 148. The separator assembly 132 also includes a plurality of second stage cyclones 204 in fluid communication with the outflow passageway 184, as described in further detail below. The first end 172 of the inner chamber 156 is positioned between the air outlet 148 and the second end 176 of the inner chamber 156 in a generally vertical arrangement. The tangential inlet 180 provides an airflow and debris to rotate around the cyclone axis 164 within the inner chamber 156. Once in the inner chamber 156, the airflow and debris move from the first end 172 of the inner chamber 156 to the second end 176 of the inner chamber 156 unimpeded by any structure extending transverse to the cyclone axis 164. The airflow exits the inner chamber 156 by passing through the perforated portion 168 of the shroud 160.

The vacuum cleaner 116 can be powered by AC power or a DC power source, such as one or more rechargeable batteries, to provide power to the suction motor. The vacuum cleaner 10 also includes a plurality of exhaust vents 192 on the housing 140 to exhaust the airflow from the suction motor and out of the housing 140.

As shown in FIG. 7, the separator assembly 132 includes a partition 196 separating the outflow passageway 184 from the debris collection chamber 152. In the embodiment illustrated in FIG. 7, the partition 196 extends away from the second end 176 of the inner chamber 156 in a direction that is perpendicular to the cyclone axis 164. In one alternative, not shown, the partition 196 extends at an oblique angle to the cyclone axis 164. Also, in the embodiment illustrated in FIG. 7, the perforated portion 168 of the shroud 160 is adjacent the second end 176 of the inner chamber 156. In some embodiments, the perforated portion 168 of the shroud 160 is perforated by a plurality of apertures in a range from 0.15 to 0.40 mm in diameter. In other embodiments, the perforated portion 168 of the shroud 160 is perforated by a plurality of apertures in a range from 0.10 to 0.3 mm in diameter, and may be in the range of 0.10 to 0.25 mm in diameter. In some embodiments, the perforated portion 168 of the shroud 160 includes an etched perforated metal. Alternatively, the perforated portion 168 may be a stamped sheet, a screen mesh, or other perforated material.

Figure 8:
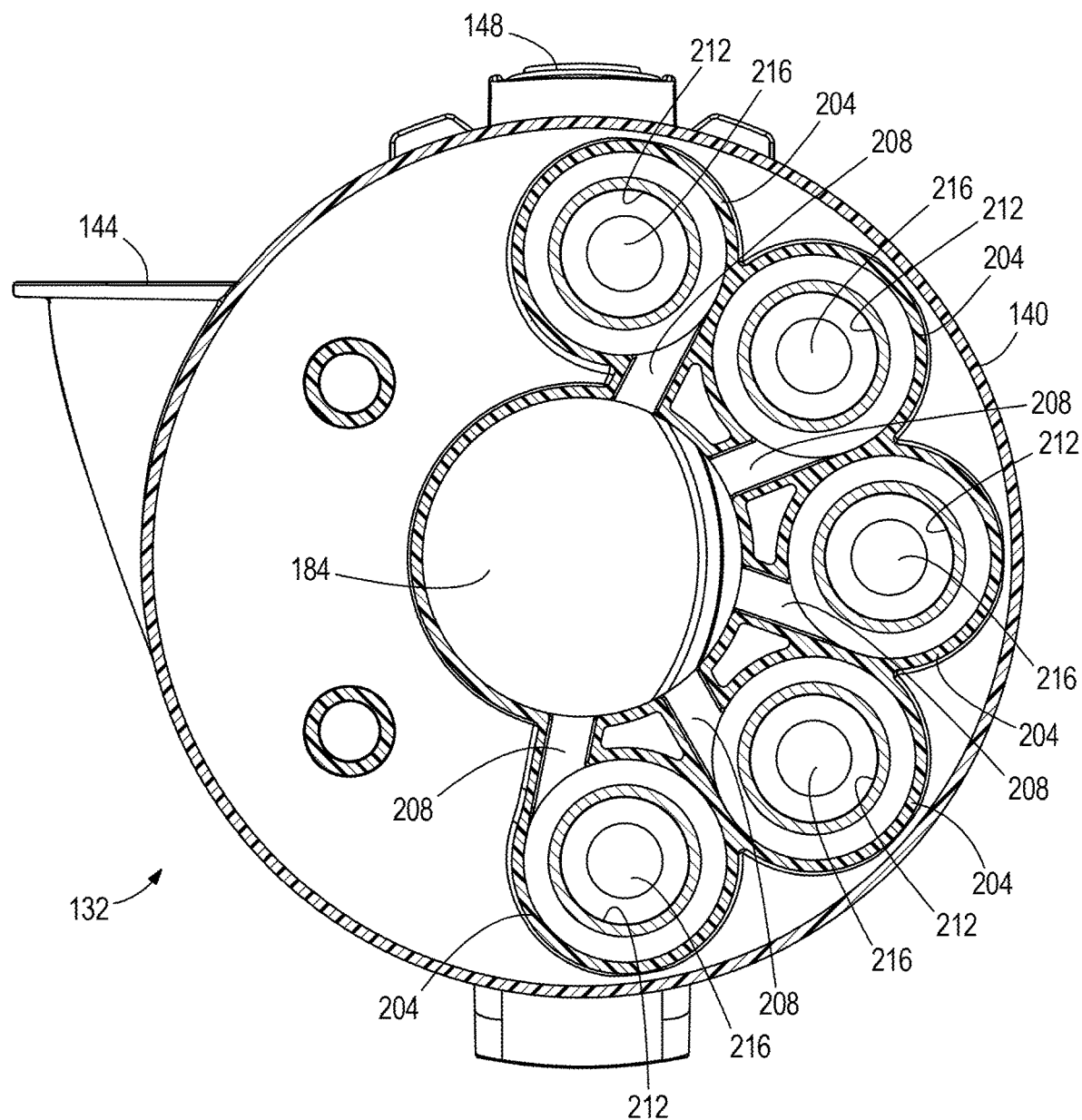
FIG. 8 is a cross-sectional view of the separator assembly of FIG. 6.

With reference to FIGS. 7 and 8, the outflow passageway 184 is in fluid communication with to the plurality of second stage cyclones 204. Each of the second stage cyclones 204 includes a tangential second stage air inlet 208, a second stage air outlet 212, and second stage debris outlet 216. Each of the second stage debris outlets 216 leads to a second stage dust chamber 220. Each of the second stage air outlets 212 is in fluid communication with a filter chamber 224 in which a filter 188 is arranged between the second stage air outlets 212 and the air outlet 148. The filter chamber 224 is arranged at an upper end 226 of the housing 140 of the separator assembly. In one alternative, the filter 188 is not positioned in the separator assembly 132 but is mounted in the vacuum cleaner housing 120. In yet another alternative, not shown, a cylindrical filter is positioned around the shroud 160 in the outflow passageway 184, such that the air flow through the cylindrical filter is transverse to the cyclone axis 164 to enter the outflow passageway 184. As shown in FIG. 7, the plurality of second stage cyclones 204 are positioned adjacent the inner chamber 156, and are arranged around the shroud 160 in at least a partially concentric arrangement.

With reference to FIGS. 6 and 7, the separator assembly 132 includes a bottom door 232 at a lower end 236 of the separator assembly 132 openable by a latch 228, allowing an operator to empty the debris collected in the debris collection chamber 152 after the separator assembly 132 has been removed from the vacuum cleaner 116. In the embodiment illustrated in FIG. 7, the second stage dust chamber 220 is closed by a removable cover 222. In some embodiments, the second stage dust chamber 220 is openable with the bottom door 232. In the embodiment illustrated in FIGS. 6-7, the partition 196, the shroud 160, or both are removable from the upper end 226 of the separator assembly 132.

In operation, while the separator assembly 132 is mounted to the vacuum cleaner 116, an operator actuates the suction motor of the vacuum cleaner 116, which generates an airflow through the suction inlet 124 to draw debris with the airflow through the suction inlet 124. The airflow then moves from the suction inlet 124 through the first conduit 128 to the air inlet 144 of the separator assembly 132. From the air inlet 144, the airflow enters the inner chamber 156 via the tangential inlet 180, which provides the airflow and debris to rotate around the cyclone axis 164 within the inner chamber 156. Once in the inner chamber 156, the airflow and debris move from the first end 172 of the inner chamber 156 to the second end 176 of the inner chamber 156 unimpeded by any structure extending transverse to the cyclone axis 164. The cyclonic action within inner chamber 156 causes larger debris to drop out of the airflow and into the debris collection chamber 152, because the second end 176 of the inner chamber 156 is open to the debris collection chamber 152.

The airflow exits the inner chamber 156 and enters the outflow passageway 184 by passing through the perforated portion 168 of the shroud 160. The airflow then moves through the outflow passageway 184 and into each of the second stage cyclones 204 via each of the tangential second stage air inlets 208. The cyclonic action within each second stage cyclone 204 causes debris that passed through the perforated portion 168 to drop out of the airflow, through the second stage debris outlets 216 and into the second stage dust chamber 220. The airflow exits out of each second stage cyclone 204 via the second stage air outlet 212, where the airflow enters the filter chamber 224. The airflow is further filtered by filter 188 in filter chamber 224, before it is drawn out of the air outlet 148 and into the second conduit 136 of the vacuum cleaner 116. The second conduit 136 fluidly communicates the airflow to the suction motor, after which it is exhausted out of the vacuum cleaner 116 via the exhaust vents 192.

Figure 9:
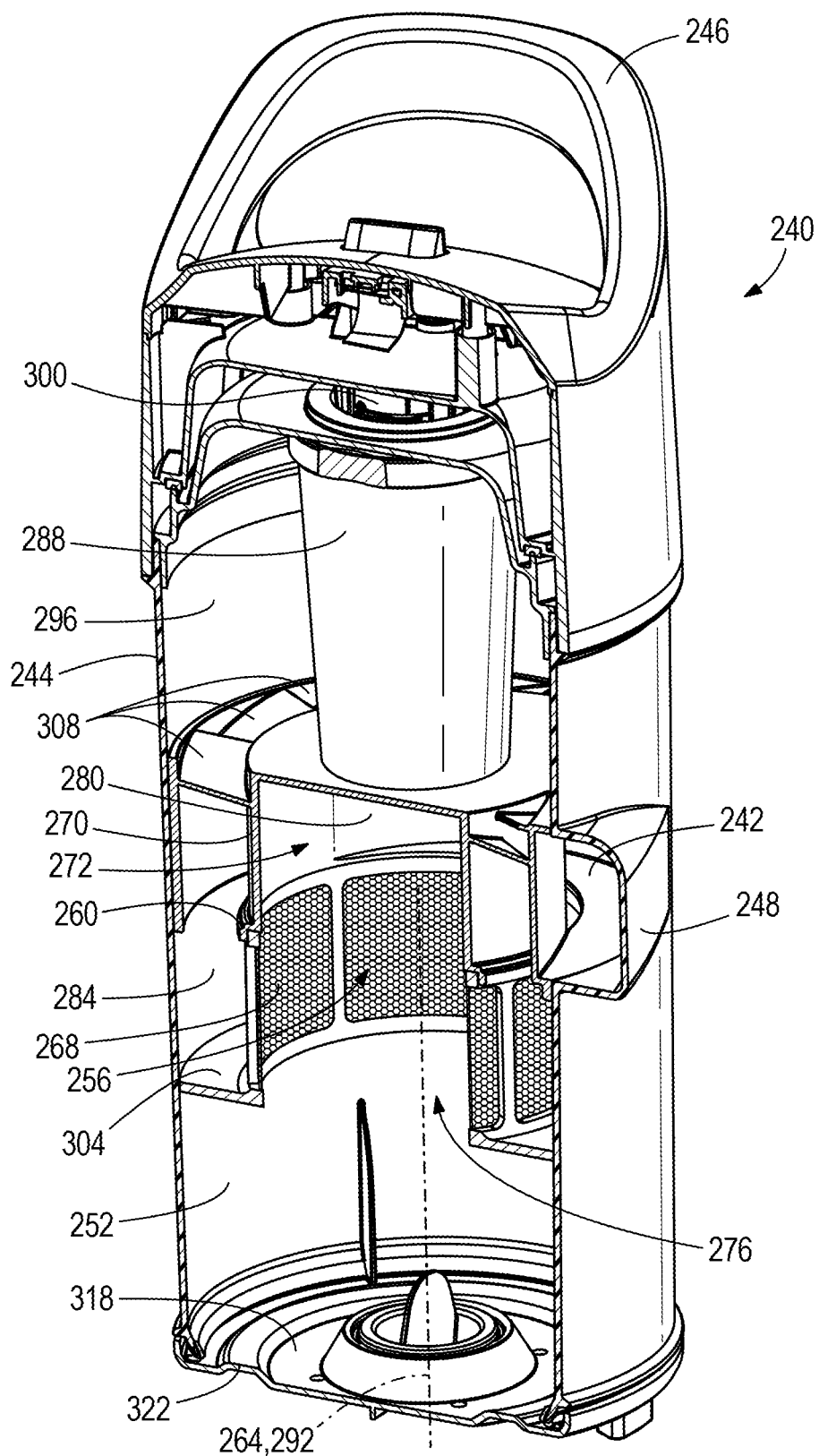
FIG. 9 is a cross-sectional view of another embodiment of a separator assembly of the vacuum cleaner of FIG. 4.
Figure 10:
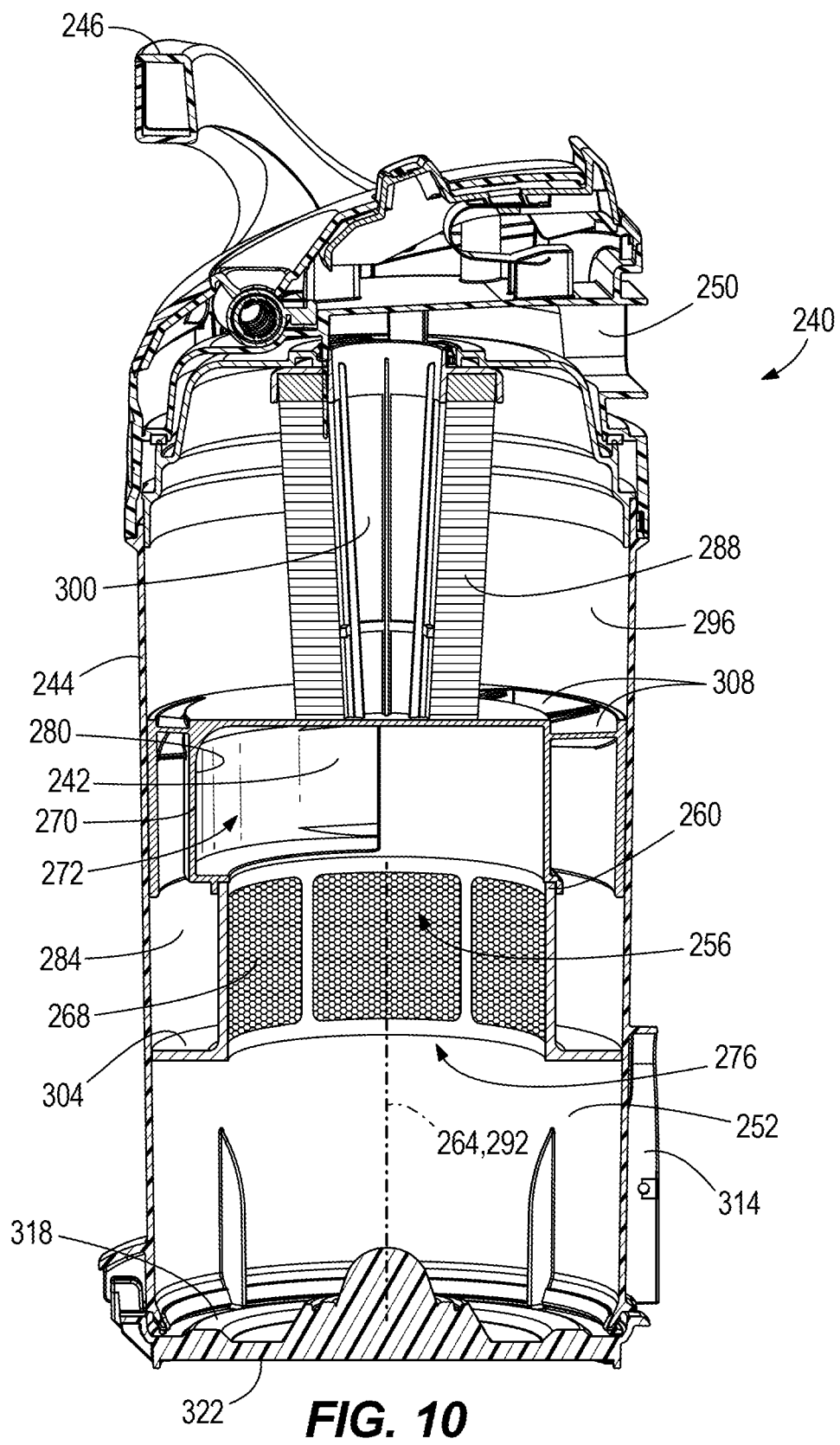
FIG. 10 is a cross-sectional view of the separator assembly of FIG. 9.

FIGS. 9 and 10 illustrate another embodiment of a separator assembly 240 for the vacuum cleaner 116. As shown in FIGS. 9 and 10, the separator assembly 240 includes a housing 244 having a handle 246, an air inlet 248, an air outlet 250, and a debris collection chamber 252 within the housing 244. When the separator assembly 240 is mounted on the vacuum cleaner 116, the air inlet 248 is fluidly coupled with the first conduit 128 and the air outlet 250 is fluidly coupled with the second conduit 136. The separator assembly 240 also includes an inner chamber 256 formed within a shroud 260 that defines a cyclone axis 264. The shroud 260 has a perforated portion 268 and a non-perforated portion 270. The inner chamber 256 has a first end 272 and a second end 276. The non-perforated portion 270 is adjacent the first end 272 of the inner chamber 256.

In the embodiment illustrated by FIG. 9, the air inlet 248 is connected to a duct 242 in communication with a tangential inlet 280 to the inner chamber 256 at the first end 272, and the second end 276 is open toward the debris collection chamber 252. In one embodiment, not shown, the first end 272 of the inner chamber 256 includes a helical ramp in fluid communication with the duct 242 and the tangential inlet 280. The separator assembly 240 also includes an outflow passageway 284 outside of the shroud 260 and in fluid communication with the air outlet 250. The separator assembly 240 also includes a filter 288 in fluid communication with the outflow passageway 284. The filter 288 is a cylindrical filter arranged along a longitudinal axis 292 defined by a filter chamber 296, in which the filter 288 is arranged. In the illustrated embodiment, the filter chamber 296 is positioned between the first end 272 of the inner chamber 256 and the air outlet 250. With reference to FIGS. 9 and 10, the outflow passageway 184 includes a plurality of swirl vanes 308 configured to generate a swirl or rotational flow in the filter chamber 296 around the longitudinal axis 292 and the filter 288. In the embodiment illustrated in FIG. 9, the longitudinal axis 292 is coaxial with the cyclone axis 264, but in other embodiments, the longitudinal axis 292 is parallel but not coaxial with the cyclone axis 264. The filter 288 surrounds a filter outlet passageway 300 that is fluidly coupled to the air outlet 250.

With continued reference to FIGS. 9 and 10, the first end 272 of the inner chamber 256 is positioned between the air outlet 250 and the second end 276 of the inner chamber 256. The first end 272 is also positioned between the filter chamber 296 and the second end 276 in a generally vertical arrangement. The duct 242 passes through the outflow passageway 284 to connect the air inlet 248 to the tangential inlet 280 of the inner chamber 256. Airflow and debris enter the inner chamber 256 along the tangential inlet 280, which provides the airflow and debris to rotate around the cyclone axis 264 within the inner chamber 256. Once in the inner chamber 256, the airflow and debris move from the first end 272 of the inner chamber 256 to the second end 276 of the inner chamber 256 unimpeded by any structure extending transverse to the cyclone axis 264. The airflow exits the inner chamber 256 by passing through the perforated portion 268 of the shroud 260 into the outflow passageway 284. From the outflow passageway 284, the airflow passes through the swirl vanes 308 to the filter chamber 296.

With continued reference to FIGS. 9 and 10, the separator assembly 240 includes a partition 304 separating the outflow passageway 284 from the debris collection chamber 252. In the embodiment illustrated in FIGS. 9 and 10, the partition 304 extends away from the second end 276 of the inner chamber 256 in a direction that is perpendicular to the cyclone axis 264. In one alternative, the partition 304 extends at an oblique angle to the cyclone axis 264. Also, in the embodiment illustrated in FIGS. 9 and 10, the perforated portion 268 of the shroud 260 is adjacent the second end 276 of the inner chamber 256. In some embodiments, the perforated portion 268 of the shroud 260 is perforated by a plurality of apertures in a range from 0.15 to 0.40 mm in diameter. In other embodiments, the perforated portion 268 of the shroud 260 is perforated by a plurality of apertures in a range from 0.10 to 0.3 mm in diameter, and may be in the range of 0.10 to 0.25 mm in diameter. In some embodiments, the perforated portion 268 of the shroud 260 includes an etched perforated metal. Alternatively, the perforated portion 268 may be a stamped sheet, a screen mesh, or other perforated material.

Figure 10A:
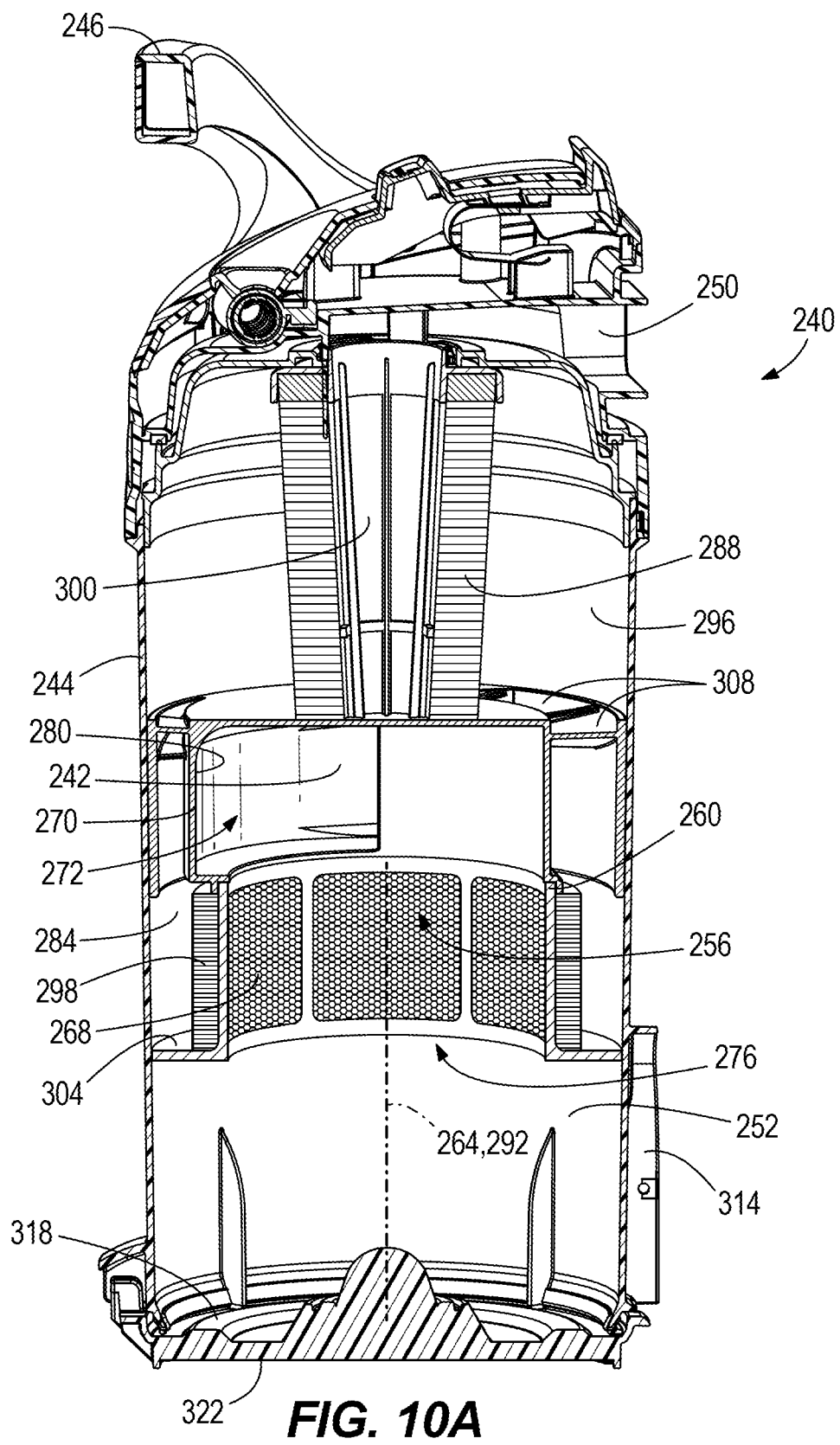
FIG. 10A is a cross-sectional view of an alternative embodiment of the separator assembly of FIG. 9.

In one embodiment shown in FIG. 10A, a cylindrical filter 298 is positioned around the shroud 260 in the outflow passageway 284. In this embodiment, airflow passing through the perforated shroud 268 enters and passes through the cylindrical filter 298 in a direction that is transverse to the cyclone axis to enter the outflow passageway 284.

With reference to FIG. 10, the separator assembly 240 includes a bottom door 318 at a lower end 322 of the separator assembly 240 openable by a latch 314, allowing an operator to empty the debris collected in the debris collection chamber 252 after the separator assembly 240 has been removed from the vacuum cleaner 116.

In operation, when the separator assembly 240 of FIGS. 9 and 10 is mounted to the vacuum cleaner of FIGS. 4 and 5, an operator actuates the suction motor of the vacuum cleaner 116, which generates an airflow through the suction inlet 124 to draw debris with the airflow through the suction inlet 124. The airflow then moves from the suction inlet 124 through the first conduit 128 to the air inlet 248 of the separator assembly 240. From the air inlet 248, the airflow enters the inner chamber 256 via the duct 242 and tangential inlet 280, which causes the airflow and debris to rotate around the cyclone axis 264 within the inner chamber 256. After entering the inner chamber 256, the airflow and debris move from the first end 272 of the inner chamber 256 to the second end 276 of the inner chamber 256 unimpeded by any structure extending transverse to the cyclone axis 264. The cyclonic action within inner chamber 256 causes larger debris to drop out of the airflow and into the debris collection chamber 252, because the second end 276 of the inner chamber 256 is open to the debris collection chamber 252.

The airflow exits the inner chamber 256 and enters the outflow passageway 284 by passing through the perforated portion 268 of the shroud 260. The airflow then moves through the outflow passageway 284 and through the swirl vanes 308, causing the airflow to be swirled around the filter 288 within the filter chamber 296. The airflow then flows through the filter 288 in a direction transverse to the longitudinal axis 292 of the filter chamber 296, causing more particulate matter to be filtered out. The airflow then flows through the passageway 300 to the air outlet 250, where it is then drawn into the second conduit 136 of the vacuum cleaner 116. The second conduit 136 fluidly communicates the airflow to the suction motor, after which it is exhausted out of the vacuum cleaner 116 via the exhaust vents 192.

Figure 11:
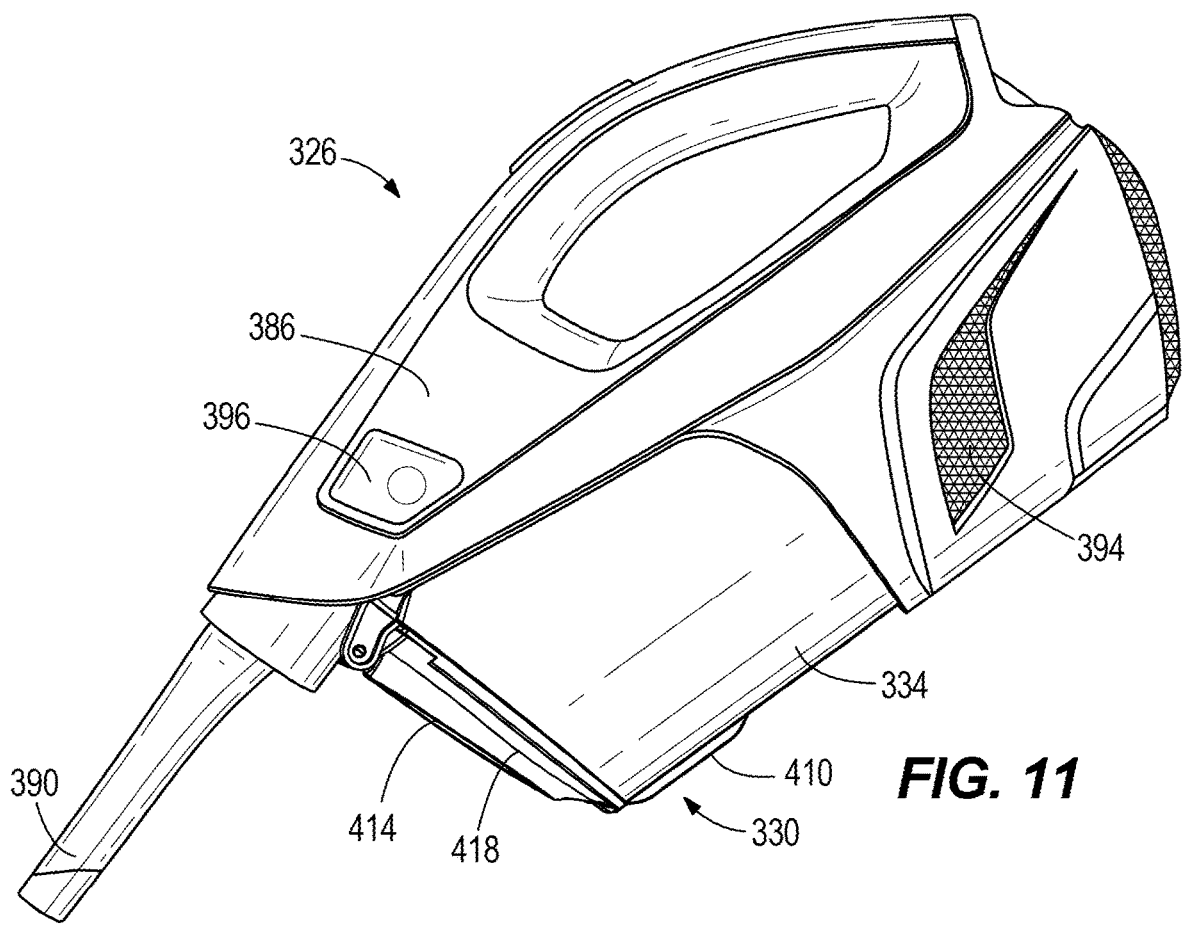
FIG. 11 is a perspective view of another embodiment of a vacuum cleaner.

FIG. 11 illustrates another embodiment of a vacuum cleaner 326. As shown in FIGS. 11-14 and explained in further detail below, the vacuum cleaner 326 includes a separator assembly 330 including a separator assembly housing 334 having an air inlet 338, an air outlet 342, and a debris collection chamber 346 within the housing 334. The separator assembly 330 also includes an inner chamber 350 formed within a shroud 354 that defines a cyclone axis 358. The shroud 354 has a perforated portion 360 and a non-perforated portion 362. The inner chamber 350 has a first end 366 and a second end 370. The non-perforated portion 362 is arranged adjacent the first end 366 of the inner chamber 350.

Figure 13:
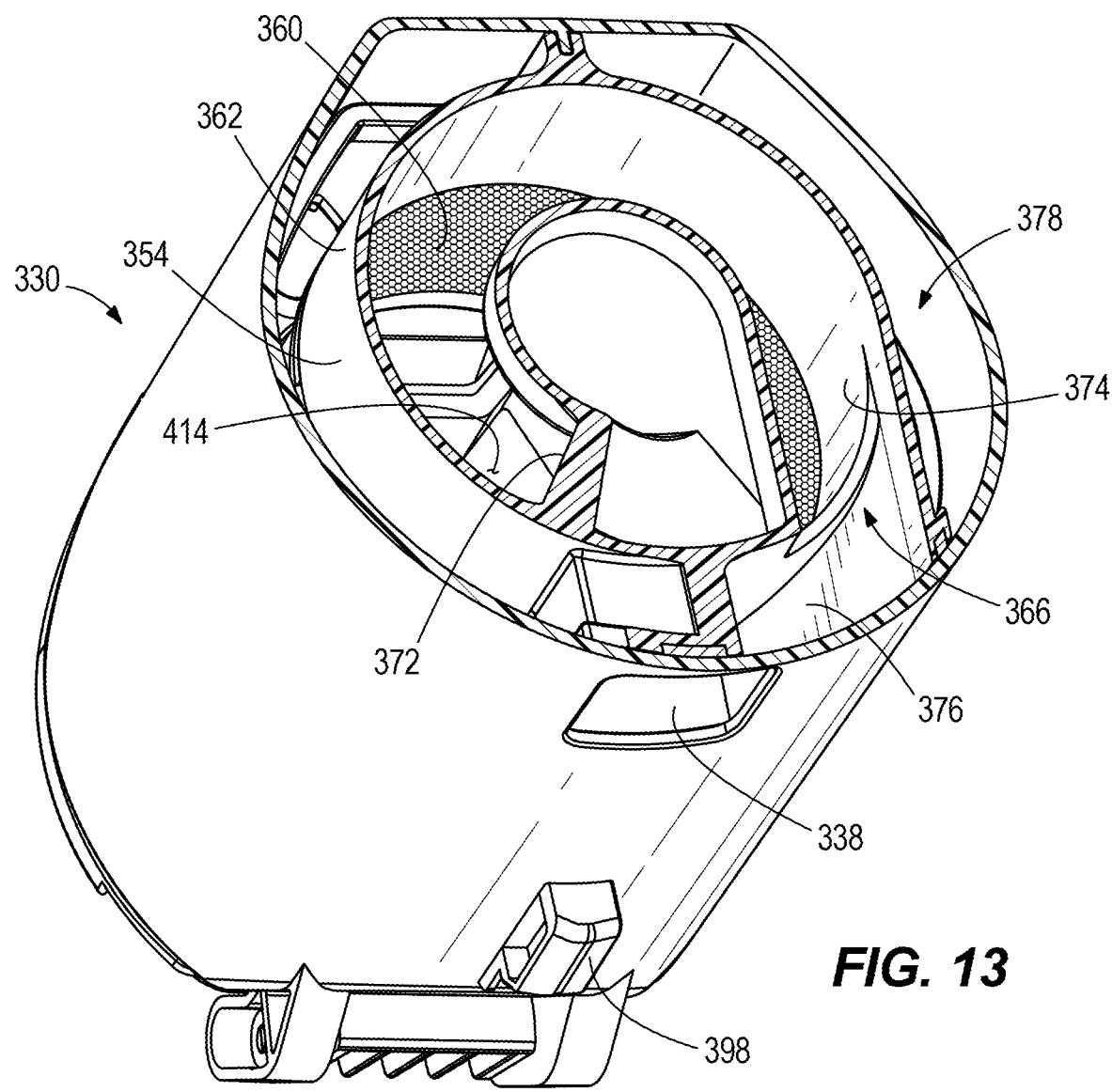
FIG. 13 is a cross-sectional view of the separator assembly of FIG. 12.

The first end 366 has a helical ramp 372 in fluid communication with the air inlet 338 by a duct 376 shown in FIG. 13, the helical ramp 372 leading to a tangential inlet 374 to the inner chamber, and the second end 370 of the inner chamber 350 is open toward the debris collection chamber 346. The separator assembly 330 also includes an outflow passageway 378 outside of the shroud 354 and in fluid communication with the air outlet 342. The separator assembly 330 also includes a filter 382 in fluid communication with the outflow passageway 378. The first end 366 of the inner chamber 350 is positioned between the air outlet 342 and the second end 370 of the inner chamber 350. The duct 376 passes through the outflow passageway 378 to connect the air inlet 338 to the inner chamber 350. Airflow and debris enter the inner chamber 350 along the tangential inlet 374, which causes an airflow and debris to rotate around the cyclone axis 358 within the inner chamber 350. Once in the inner chamber 350, the airflow and debris move from the first end 366 of the inner chamber 350 to the second end 370 of the inner chamber 350 unimpeded by any structure extending transverse to the cyclone axis 358. The airflow exits the inner chamber 350 by passing through the perforated portion 360 of the shroud 354 into the outflow passageway 378.

With reference again to FIG. 11, the vacuum cleaner 326 includes an outer housing 386, a suction inlet 390 and a suction source, such as a suction motor (not shown), to generate an airflow through the suction inlet 390 to draw debris with the airflow through the suction inlet 390. When the separator assembly 330 is mounted to the vacuum cleaner 326, the suction inlet 390 is fluidly coupled to the air inlet 338 of the separator assembly 330, and the suction motor is fluidly coupled to the air outlet 342 of the separator assembly 330. The vacuum cleaner 326 includes a power source, such as one or more rechargeable batteries, to provide power to the suction motor, and a switch to actuate the suction motor. The vacuum cleaner 326 also includes a plurality of exhaust vents 394 on the housing 386 to exhaust the airflow from the suction motor and out of the housing 386. The vacuum cleaner 326 also includes a latch 396 to release a hook 398 of the separator assembly 330, thereby allowing an operator to remove the separator assembly 330 from the vacuum cleaner 326.

Figure 14:
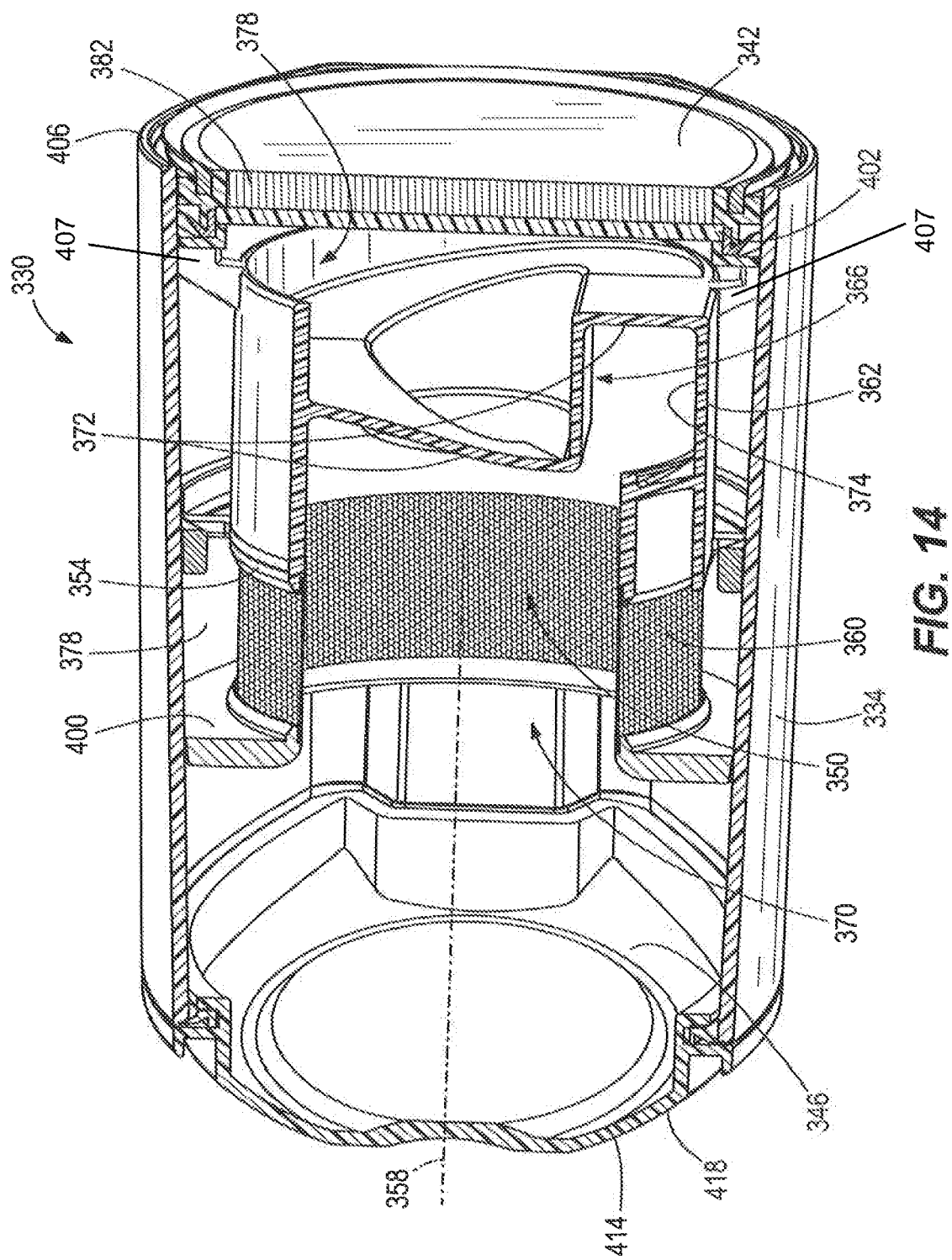
FIG. 14 is a cross-sectional view of the separator assembly of FIG. 12.

With continued reference to FIG. 14, the separator assembly 330 includes a partition 400 separating the outflow passageway 378 from the debris collection chamber 346. In the embodiment illustrated in FIG. 14, the partition 400 extends away from the second end 370 of the inner chamber 350 in a direction that is perpendicular to the cyclone axis 358 such that the outflow passageway 378 is bounded by the separator assembly housing 334 and the shroud 354. In one alternative, the partition 400 extends at an angle to the cyclone axis 358. Also, in the embodiment illustrated in FIG. 14, the perforated portion 360 of the shroud 354 is adjacent the second end 370 of the inner chamber 350. In some embodiments, the perforated portion 360 of the shroud 354 is perforated by a plurality of apertures in a range from 0.15 to 0.40 mm in diameter. In other embodiments, the perforated portion 360 of the shroud 354 is perforated by a plurality of apertures in a range from 0.10 to 0.3 mm in diameter, and may be in the range of 0.10 to 0.25 mm in diameter. In some embodiments, the perforated portion 360 of the shroud 354 includes an etched perforated metal. Alternatively, the perforated portion 360 may be a stamped sheet, a screen mesh, or other perforated material.

As illustrated in the embodiment shown in FIG. 14, the filter 382 is positioned in a filter chamber 402 arranged at an upper end 406 of the housing 334 of the separator assembly 330. As further illustrated in the embodiment shown in FIG. 14, the filter chamber 402 is arranged between the first end 366 of the inner chamber 350 and the air outlet 342 of the separator assembly 330. Also in the illustrated embodiment, the shroud 354 includes standoffs or tabs 407 that properly position the filter 382 in the separator assembly 330. The filter 382 contacts the tabs 407 to stop movement of the filter 382 toward a lower end 418 of the separator assembly 330. Therefore, the user cannot insert the filter 382 too far toward the lower end 418 and the filter 382 is held in position and also the filter 382 is not drawn toward the lower end 418 by the suction airflow. The tabs 407 are coupled to the shroud 354 so that the tabs 407 are removable with the shroud 354 from the housing 334. The filter chamber 402 is in fluid communication with the outflow passageway 378. In one alternative, the filter 382 is not positioned in the separator assembly 330 but is mounted in the vacuum cleaner housing 383. In yet another alternative, not shown, a cylindrical filter is positioned around the shroud 354 in the outflow passageway 378, such that the air flow through the cylindrical filter is transverse to the cyclone axis 358 to enter the outflow passageway 378.

Figure 12:
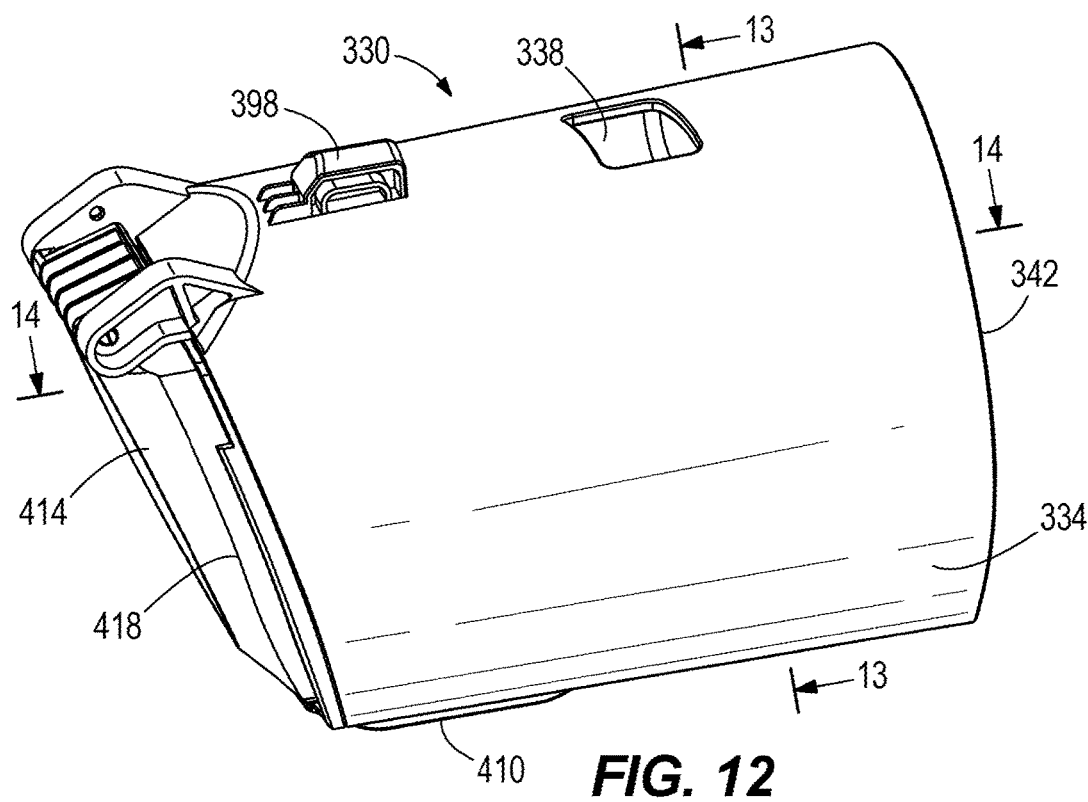
FIG. 12 is a perspective view of a separator assembly of the vacuum cleaner of FIG. 11.

With reference to FIGS. 12 and 14, the separator assembly 330 includes a latch 410, whose actuation causes a door 414 at the lower end 418 of the separator assembly 330 to pivot open, allowing an operator to empty the debris collected in the debris collection chamber 346 without removing the separator assembly 330 from the housing 68 of the vacuum cleaner 326. In the embodiment illustrated in FIGS. 12-14, the partition 400 is integral with the shroud 354 and both are removable from the upper end 406 of the housing 334 of the separator assembly 330. Alternatively, the partition 400 is integral with the separator assembly housing 334. In another alternative, the partition 400, the shroud 354, or both are removable from the upper end 406 or lower end 418 of the housing 334 of the separator assembly 330 as desired.

In operation of vacuum cleaner 326, an operator actuate the switch to actuate the suction motor, which generates an airflow through the suction inlet 390 to draw debris with the airflow through the suction inlet 390. The airflow then moves from the suction inlet 390 to the air inlet 338 of the separator assembly 330. From the air inlet 338, the airflow passes through the duct 376 and enters the inner chamber 350 via the helical ramp 372 and the tangential inlet 374, which provides the airflow and debris to rotate around the cyclone axis 358 within the inner chamber 350. After entering the inner chamber 350, the airflow and debris move from the first end 366 of the inner chamber 350 to the second end 370 of the inner chamber 350 unimpeded by any structure extending transverse to the cyclone axis 358. The cyclonic action within inner chamber 350 causes larger debris to drop out of the airflow and into the debris collection chamber 346, because the second end 370 of the inner chamber 350 is open to the debris collection chamber 346.

Meanwhile, the airflow exits the inner chamber 350 and enters the outflow passageway 378 by passing through the perforated portion 360 of the shroud 354. The airflow then moves through the outflow passageway 378 and into the filter chamber 402, where additional debris that passed through the perforated portion 360 is filtered out of the airflow by the filter 382. The airflow then passes into the air outlet 342 and through the suction motor before it is exhausted out of exhaust vents 394 on the housing 386 of vacuum cleaner 326.

Various features of the invention are set forth in the following claims.

What is claimed is:

1. A vacuum cleaner comprising:
   a suction inlet;
   a suction source configured to generate an airflow through the suction inlet to draw debris with the airflow through the suction inlet; and
   a separator assembly downstream from the suction inlet for separating debris from the airflow, the separator assembly including:
   a housing having an air inlet and an air outlet,
   a debris collection chamber within the housing,
   an inner chamber formed within a shroud that defines a cyclone axis and has a perforated portion, the inner chamber having a first end and a second end, the first end having a tangential inlet, the second end being open toward the debris collection chamber, and
   an outflow passageway outside of the shroud and in fluid communication with the air outlet,
   wherein the tangential inlet is configured to provide airflow and debris to rotate around the cyclone axis within the inner chamber,
   wherein the airflow and debris is configured to move from the first end of the inner chamber toward the second end of the inner chamber unimpeded by any structure extending transverse to the cyclone axis, and
   wherein the airflow is configured to exit the inner chamber and enter the outflow passageway by passing through the perforated portion of the shroud.

2. The vacuum cleaner of claim 1, further comprising a partition separating the outflow passageway from the debris collection chamber.

3. The vacuum cleaner of claim 2, wherein the housing has an upper end and a lower end, and wherein the partition, the shroud, or both are removable from the upper end.

4. The vacuum cleaner of claim 3, wherein the partition extends away from the second end of the inner chamber in a direction that is perpendicular to the cyclone axis.

5. The vacuum cleaner of claim 2, where the partition is shaped as a frustum extending away from the second end of the inner chamber.

6. The vacuum cleaner of claim 1, wherein the shroud includes a non-perforated portion adjacent the first end.

7. The vacuum cleaner of claim 1, wherein the perforated portion of the shroud is perforated by a plurality of apertures in a range from 0.10 to 0.40 mm in diameter.

8. The vacuum cleaner of claim 7, wherein the perforated portion of the shroud includes an etched perforated metal.

9. The vacuum cleaner of claim 1, wherein the first end includes a helical ramp extending toward the second end of the inner chamber.

10. The vacuum cleaner of claim 1, wherein the perforated portion of the shroud is adjacent the second end of the inner chamber.

11. The vacuum cleaner of claim 1, wherein the debris collection chamber at least partially surrounds the shroud.

12. The vacuum cleaner of claim 1, wherein the debris collection chamber has an end that is intersected by the cyclone axis and spaced from the second end of the inner chamber.

13. The vacuum cleaner of claim 12, wherein the end of the debris collection chamber is an end of the separator assembly.

14. The vacuum cleaner of claim 12, wherein the end of the debris collection chamber is a door, the door openable to empty the debris collected in the debris collection chamber.

15. The vacuum cleaner of claim 1, wherein the first end of the inner chamber is positioned between the air outlet and the second end of the inner chamber.

16. A vacuum cleaner comprising:
    a suction inlet;
    a suction source configured to generate an airflow through the suction inlet to draw debris with the airflow through the suction inlet; and
    a separator assembly downstream from the suction inlet for separating debris from the airflow, the separator assembly including:
    a housing having an air inlet and an air outlet,
    a debris collection chamber within the housing,
    an inner chamber within a shroud that defines a cyclone axis and has a perforated portion, the inner chamber having a first end and a second end, the second end being open toward the debris collection chamber,
    wherein the air inlet is configured to provide the airflow and debris to rotate around the cyclone axis within the shroud, an outflow passageway outside of the shroud and in fluid communication with the air outlet, wherein the air flow is configured to exit the inner chamber and enter the outflow passageway by passing through the perforated portion of the shroud, and a plurality of second stage cyclones, each having a second stage air inlet, a second stage air outlet, and a debris outlet, each second stage air inlet being in fluid communication with the outflow passageway.

17. The vacuum cleaner of claim 16, wherein the plurality of second stage cyclones are positioned adjacent the inner chamber.

18. The vacuum cleaner of claim 16, wherein the plurality of second stage cyclones are arranged around the shroud at least partially concentric to the shroud.

19. The vacuum cleaner of claim 16, wherein the housing has an upper end and a lower end, where the lower end is openable, and wherein the second stage cyclone debris outlets discharge into a second stage dust chamber that is openable with the lower end.

20. The vacuum cleaner of claim 16, wherein the perforated portion of the shroud is adjacent the second end of the inner chamber.

* * * * *